United States Patent
Ikezawa et al.

(10) Patent No.: US 11,305,772 B2
(45) Date of Patent: Apr. 19, 2022

(54) DRIVING ASSISTANCE APPARATUS

(71) Applicant: Toyota Jidosha Kabushiki Kaisha, Toyota (JP)

(72) Inventors: Yuta Ikezawa, Susono (JP); Kohei Tochigi, Susono (JP); Shogo Ito, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 82 days.

(21) Appl. No.: 16/743,648

(22) Filed: Jan. 15, 2020

(65) Prior Publication Data
US 2020/0231154 A1 Jul. 23, 2020

(30) Foreign Application Priority Data

Jan. 17, 2019 (JP) ............................. JP2019-006235

(51) Int. Cl.
*B60W 30/18* (2012.01)
*B60W 30/02* (2012.01)
*B60W 40/076* (2012.01)

(52) U.S. Cl.
CPC ........ *B60W 30/181* (2013.01); *B60W 30/025* (2013.01); *B60W 40/076* (2013.01); *B60W 2552/15* (2020.02); *B60W 2552/53* (2020.02)

(58) Field of Classification Search
CPC ............. B60W 30/181; B60W 30/025; B60W 40/076; B60W 2552/53; B60W 2552/15; B60W 10/06; B60W 10/08; B60W 10/18; B60W 2555/60; B60W 2552/10; B60W 30/18136; B60W 30/18072; B60W 30/18127; B60W 2540/225; B60W 2540/22; B60W 2554/802
See application file for complete search history.

(56) References Cited

U.S. PATENT DOCUMENTS

| | | | |
|---|---|---|---|
| 2007/0050110 A1* | 3/2007 | Kondoh | B60W 30/146 701/36 |
| 2013/0338852 A1* | 12/2013 | Otake | G08G 1/09626 701/1 |
| 2014/0358841 A1* | 12/2014 | Ono | G08G 1/0129 706/52 |

FOREIGN PATENT DOCUMENTS

| | | |
|---|---|---|
| JP | 2014-104856 A | 6/2014 |
| JP | 2018131027 A | 8/2018 |

* cited by examiner

*Primary Examiner* — Marthe Y Marc-Coleman
(74) *Attorney, Agent, or Firm* — Dinsmore & Shohl LLP

(57) ABSTRACT

A driving assistance apparatus can execute a deceleration assistance control, when there is a deceleration target ahead, of the vehicle in a course thereof. The driving assistance apparatus is provided with: a recognizer configured to recognize a surrounding situation of the vehicle; and a controller programed to execute the deceleration assistance control when a predetermined condition is satisfied. The controller is programed to suppress execution of the deceleration assistance control if a road as the recognized surrounding situation has a high extent of a downgrade, in comparison with a situation in which the road has a low extent of the downgrade.

7 Claims, 5 Drawing Sheets

DRIVING ASSISTANCE APPARATUS

CROSS-REFERENCE TO RELATED APPLICATIONS

This application is based upon and claims the benefit of priority of the prior Japanese Patent Application No. 2019-006235, filed on Jan. 17, 2019, the entire contents of which are incorporated herein by reference.

BACKGROUND

Technical Field

Embodiments of the present disclosure relate to a driving assistance apparatus, and particularly relate to a driving assistance apparatus configured to provide deceleration assistance.

Description of the Related Art

For this type of apparatus, for example, there is proposed an apparatus configured to perform a deceleration control on a host vehicle if it is determined that the host vehicle is in a situation in which it is to be decelerated or to be stopped (refer to Japanese Patent Application Laid Open No. 2018-131027 (Patent Literature 1)).

For example, when a vehicle goes down a slope, a driver tends to turn off an accelerator (i.e., stop stepping on an accelerator pedal) earlier than when the vehicle travels on a flatland. If the deceleration control is uniformly performed regardless of a road glide, the driver may feel discomfort, which is technically problematic. A technology/technique described, in the Patent Literature 1 does not take into account the road grade and thus cannot solve the problem.

SUMMARY

In view of the problem described above, it is therefore an object of embodiments of the present disclosure to provide a driving assistance apparatus configured to appropriately provide deceleration assistance while preventing a driver from feeling discomfort.

The above object of embodiments of the present disclosure can be achieved by a driving assistance apparatus configured to execute a deceleration assistance control of assisting in decelerating a vehicle, when there is a deceleration target ahead of the vehicle in a course thereof, the driving assistance apparatus provided with: a recognizer configured to recognize a surrounding situation of the vehicle; and a controller programed to execute the deceleration assistance control when a predetermined condition is satisfied, wherein the controller is programmed to suppress execution of the deceleration assistance control if a road as the recognized surrounding situation has a downgrade, in comparison with a situation in which the road does not have a downgrade.

DETAILED DESCRIPTION OF THE EMBODIMENTS

A driving assistance apparatus according to embodiments of the present disclosure will be explained with reference to the drawings.

First Embodiment

A driving assistance apparatus according to a first embodiment will be explained with reference to FIG. 1 to FIG. 3.

(Configuration)

A configuration of the driving assistance apparatus according to the first embodiment will be explained with reference to FIG. 1. FIG. 1 is a block diagram illustrating the configuration of the driving assistance apparatus according to the first embodiment.

Figure 1:
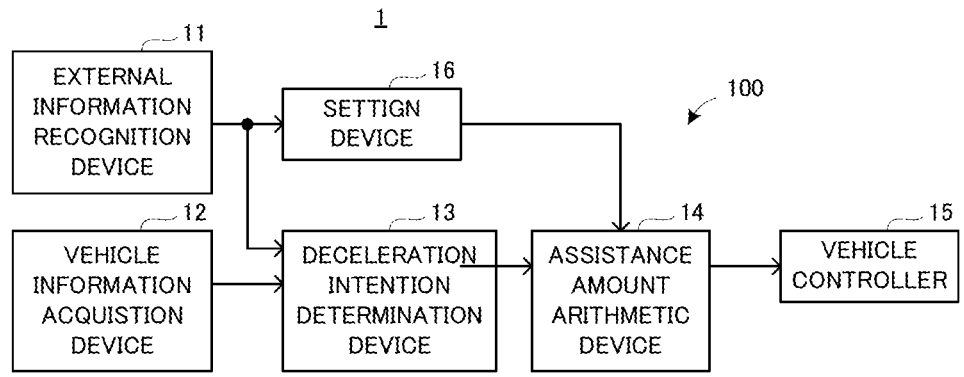
FIG. 1 is a block diagram illustrating a configuration of a driving assistance apparatus according to a first embodiment.

In FIG. 1, a driving assistance apparatus 100 is mounted on a vehicle 1. The driving assistance apparatus 100 is configured to execute a deceleration assistance control of assisting in decelerating the vehicle 1 when there is a deceleration target ahead of the vehicle 1 in a course thereof. Here, the "deceleration target" may be something that requires the vehicle 1 to decelerate or stop. Specifically, an example includes: an obstacle, such as, for example, another vehicle, a pedestrian, and a structure; something that regulates travel of the vehicle 1, such as, for example, a road sign, a red light, and a stop line; and a road structure, such as, for example, an intersection and a curve.

The driving assistance apparatus 100 is provided with an external information recognition device 11, a vehicle information acquisition device 12; a deceleration intention determination device 13, an assistance amount arithmetic device 14, a vehicle controller 15, and a setting device 16, so as to realize the deceleration assistance control.

The external information recognition device 11 is configured to recognize a surrounding situation of the vehicle 1, on the basis of an output (and also information obtained by road-vehicle communication and vehicle-vehicle communication) of a device configured to detect an external situation of the vehicle 1, such as, for example, a millimeter wave radar, a camera, and light detection and ranging (LiDAR). The external information recognition device 11 is configured to recognize one or a plurality of objects around the vehicle 1, as the surrounding situation of the vehicle 1. The external information recognition device 11 is configured to recognize an object that is in a target selection area, as the deceleration target, from among the one or the plurality of objects recognized. The external information recognition device 11 is configured to specify a type of the deceleration target in recognizing the deceleration target.

A "target recognition area" is an area in which it is determined whether or not the object recognized by the external information recognition device 11 is the deceleration target. As described above, since the deceleration assistance control is executed when there is a deceleration target ahead of the vehicle 1 in the course thereof, the target recognition area may be set ahead of the vehicle 1 in the course thereof. Moreover, since the deceleration assistance control is executed when there is a deceleration target ahead of the vehicle 1 in the course thereof (i.e., when the deceleration target is recognized by the external information recognition device 11), a distance of the target recognition area in a longitudinal direction of the vehicle 1 may be set such that a distance between the object corresponding to the deceleration target and the vehicle 1 is greater than or equal to a distance that allows the vehicle 1 to safely stop. Therefore, the distance of the target recognition area in the longitudinal direction of the vehicle 1 may be changed, for example, in accordance with a speed of the vehicle 1.

The external information recognition device 11 is further configured to recognize grade information, which indicates a grade of a road on which the vehicle 1 currently travels, as the surrounding situation of the vehicle 1, for example, from map information or the like. The external information recognition device 11 is configured to output information indicating the one or the plurality of objects including the deceleration target, and the grade information, as external information.

The vehicle information acquisition device 12 is, configured to obtain vehicle information, which indicates a state of the vehicle 1, from an output of a device configured to detect the state of the vehicle 1, such as, for example, a vehicle wheel speed sensor, an accelerator pedal sensor, a brake pedal sensor, and a steering angle sensor. A detailed explanation of a method of obtaining: the vehicle information will be omitted because various existing aspects can be applied thereto.

Now, an explanation will be given to conditions that allow the deceleration assistance control to be executed. In the first embodiment, the deceleration assistance control may be executed when the following three conditions are satisfied: (i) the deceleration target is recognized, (ii) a distance between the vehicle 1 and the recognized deceleration target is less than or equal to a predetermined distance, and (iii) the driver does not step on any of an accelerator pedal and a brake pedal.

The deceleration intention determination device 13 is configured to determine whether or not the aforementioned three conditions for executing the deceleration assistance control are satisfied. The deceleration intention determination device 13 may determine that the driver has a deceleration intention if it is determined that the three conditions are satisfied. On the other hand, the deceleration intention determination device 13 may determine that the driver does not have a deceleration to intention if it is determined that the three conditions are not satisfied.

The deceleration intention determination device 13 may also determine that the driver has a deceleration intention, when the driver's line of sight is detected and the driver is considered to gaze at the deceleration target from the detected line of sight, and/or when the driver's brain waves are detected and the detected brain waves correspond to brain waves that are peculiar to deceleration actions, in addition to when the three conditions are satisfied.

The assistance amount arithmetic device 14 is configured to arithmetically operate a deceleration assistance amount associated with the deceleration assistance control (e.g., magnitude of a braking force caused by the deceleration assistance control) when the deceleration assistance control is executed if it is determined by the deceleration intention determination device 13 that the driver has a deceleration intention). A detailed explanation of a method of arithmetically operating the deceleration assistance amount will be omitted because various existing aspects can be applied thereto.

The vehicle controller 15 is programmed or configured to control the vehicle 1 to realize target deceleration corresponding to the deceleration assistance amount arithmetically operated by the assistance amount arithmetic device 14. For example, the vehicle controller 15 may control a brake actuator, change an engine output, or execute a regenerative control on a motor.

The setting device 16 is configured to set start timing when the deceleration assistance control is executed, on the basis of the external information outputted from the external information recognition device 11. Here, various existing aspects can be applied to the expression "start timing". Specifically, for example, the start timing may be expressed as a delay time from a time point at which it is determined by the deceleration intention determination device 13 that the driver has a deceleration intention a time point at which it is determined that the three conditions for executing the deceleration assistance control are satisfied). In other words, the start timing may be expressed as a time from the time point at which it is determined by the deceleration intention determination device 13 that the driver has a deceleration intention to a start time point of the deceleration assistance control. A method of setting the start timing will be described later.

(Outline of Operations)

Figure 2A:
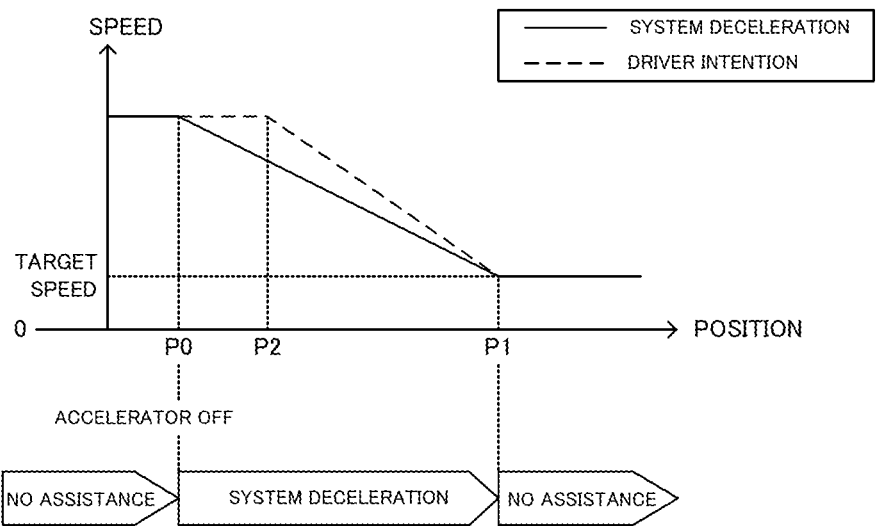
FIG. 2A is a diagram illustrating an outline of operations of a driving assistance apparatus according to a comparative example.
Figure 2B:
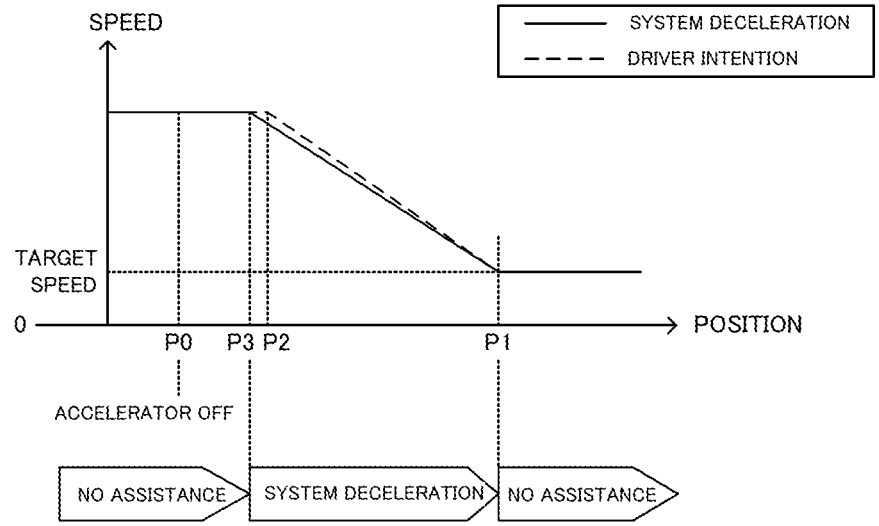
FIG. 2B is a diagram illustrating an outline of operations of the driving assistance apparatus according to the first embodiment.

Now, an outline of operations of the driving assistance apparatus 100 will be explained with reference to FIG. 2A and FIG. 2B. FIG. 2A is a diagram illustrating an outline of operations of a driving assistance apparatus according to a comparative example. FIG. 2B is a diagram illustrating an outline of operations of the driving assistance apparatus according to the first embodiment. Here, suppose that the vehicle 1 goes down a straight slope and that there is an entrance of a curve at a position P1 ahead of the vehicle 1 in the course thereof; namely, the vehicle 1 enters the curve at the position P1. The curve is an example of the deceleration target. Dashed lines in FIG. 2A and FIG. 2B indicate deceleration aspects expected by the driver, in other words, deceleration aspects when the vehicle 1 is decelerated by the driver's operation.

Suppose that the driver of the vehicle 1 turns off an accelerator at a position P1 in FIG. 2A and FIG. 2B. When the vehicle 1 goes down a slope, the driver tends to turn off the accelerator earlier than when the vehicle 1 travels on a flatland. In exam pies illustrated in FIG. 2A and FIG. 2B, suppose that the driver intends to start to decelerate the vehicle 1, for example, by stepping on the brake pedal, at a position P2 in FIG. 2A and FIG. 2B.

At this time, as illustrated in FIG. 2A, if the deceleration assistance control is started immediately after the driver turns off the accelerator, a deceleration aspect by the deceleration assistance control (refer to a solid line in FIG. 2A) deviates from the deceleration aspect expected by the driver (refer to the dashed line in FIG. 2A). As a result, the driver may feel discomfort due to the deceleration assistance control.

Thus, on the driving assistance apparatus 100, the setting device 16 may delay the start timing when the vehicle 1 goes down a slope, in comparison with a situation in which the vehicle 1 does not go down a slope. If the start timing is expressed, for example, as a delay time, the delay time may be increased. Thus, for example, as illustrated in FIG. 2B, after the driver turns off the accelerator, at a time point at which the vehicle 1 reaches a position P3, the deceleration assistance control is started. In this case, a deceleration aspect by the deceleration assistance control (refer to a solid line in FIG. 2B) is similar to the deceleration aspect expected by the driver (refer to the dashed line in FIG. 2B). It is thus possible to prevent the driver from feeling discomfort due to the deceleration assistance control.

(Operations)

Next, with reference to a flowchart in FIG. 3, an explanation will be given to the operations of the driving assistance apparatus 100.

Figure 3:
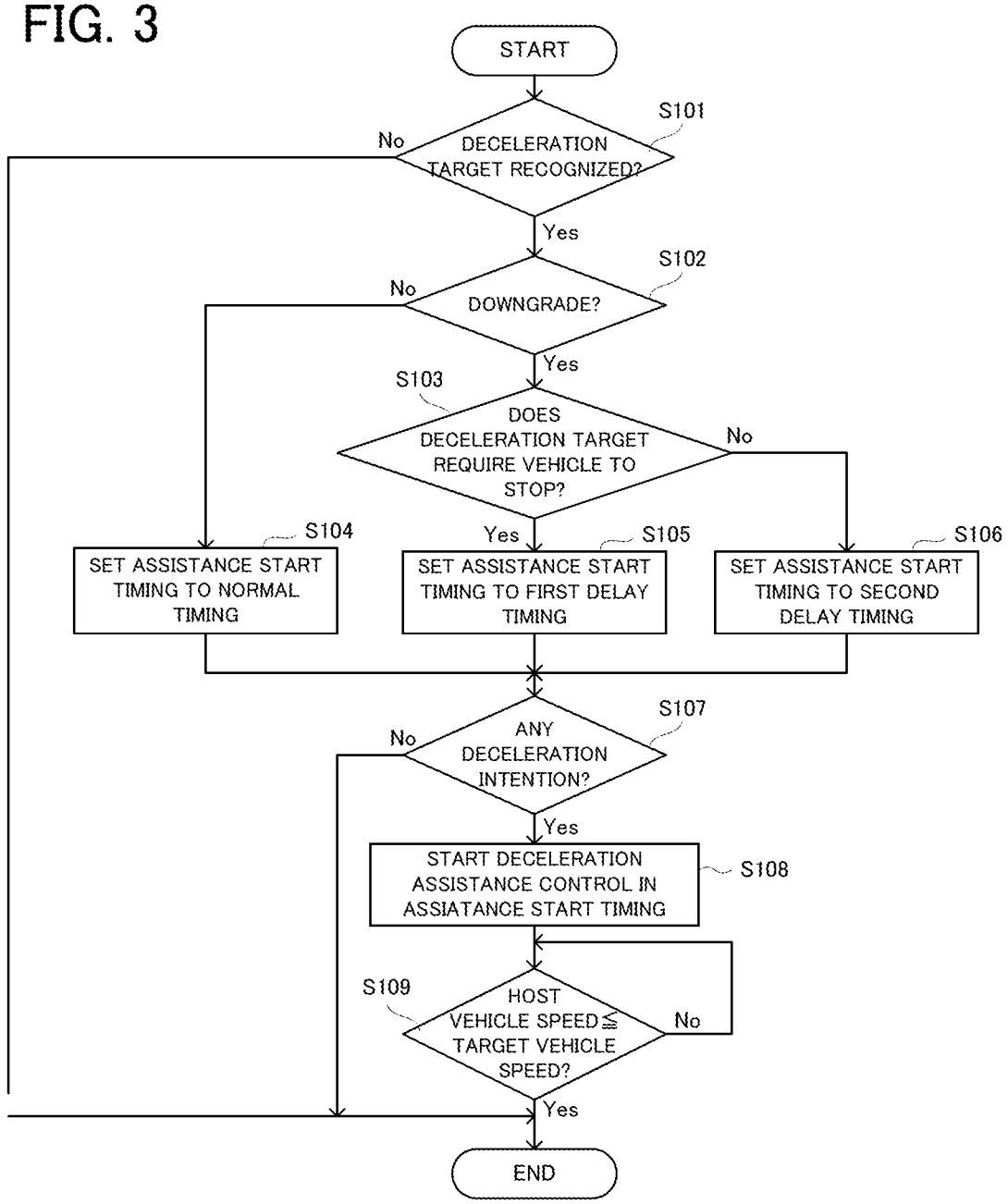
FIG. 3 is a flowchart illustrating the operations of the driving assistance apparatus according to the first embodiment.

In FIG. 3, the setting device 16 determines whether or not the deceleration target is recognized on the basis of the external information outputted from the external information recognition device 11 (step S101). In the step S101, if it is determined that the deceleration target is not recognized (the step S101: No), the operations illustrated in FIG. 3 are ended. Then, after a lapse of a first predetermined time (e.g., several ten milliseconds to several hundred milliseconds, etc.), the step S101 is executed. In other words, the operations illustrated in FIG. 3 are repeated with a period corresponding to the first predetermined time.

In the step S101 if it is determined that the deceleration target is recognized (the step S101: Yes), the setting device 16 determines whether or nota road on which the vehicle 1 travels has a downgrade (step S102). In the step S1.02, if it is determined that the road does not have a downgrade (the step S102: No), the setting device 16 sets the start timing when the deceleration assistance control is executed (hereinafter referred to as "assistance start timing" as occasion demands) to normal timing (e.g., timing in which the deceleration assistance control is started immediately after it is determined by the deceleration intention determination device 13 that the driver has a deceleration intention) (step S104).

In the step S102, if it is determined that the road has a downgrade (the step S102: Yes), the setting device 16 determines whether or not the deceleration target is something that requires the vehicle 1 to stop, on the basis of information indicating the type of the deceleration target, which is included in the external information (step S103). In the step S103, if it is determined that the deceleration target is something that requires the vehicle 1 to stop (the step S103: Yes), the setting device 16 sets the assistance start timing to first delay timing, which is later than the normal timing (step S105).

In the step S103, if it is determined that the deceleration target is not something that requires the vehicle 1 to stop (the step S103: No), the setting device 16 sets the assistance start timing to second delay timing, which is later than the first start timing (step S100).

After the step S104, the step S105, or the step S106, the deceleration intention determination device 13 determines whether or not the driver has a deceleration intention (i.e., whether or not the three condition for executing the deceleration assistance control are satisfied), on the basis of the external information and the vehicle information (step S107). In the step S107, if it is determined that the driver does not have a deceleration intention (the step S107: No), the operations illustrated in FIG. 3 are ended. Then, after a lapse of the first predetermined time, the step S101 is executed.

In the step S107, if it is determined that the driver has a deceleration intention (the step S107: Yes), the assistance amount arithmetic device 14 arithmetically operates the deceleration assistance amount such that the deceleration assistance control is started in the assistance start timing set by the setting device 16 (step S108). The vehicle controller 15 starts to control the vehicle 1 to realize the target deceleration corresponding to the deceleration assistance amount, which is arithmetically operated by the assistance amount arithmetic device 14, by which the vehicle 1 is decelerated.

Then, the assistance amount arithmetic device 14 determines whether or not the speed of the vehicle 1 is less than or equal to a target speed (step S109). In the step S109, if it is determined that the speed of the vehicle 1 is greater than the target speed (the step S109: No), the step S109 is executed again. In other words, the deceleration assistance control is continued until the speed of the vehicle 1 becomes less than or equal to the target speed. In the step S109, if it is determined that the speed of the vehicle 1 is less than or equal to the target speed (the step S109: Yes), the operations illustrated in FIG. 3 are ended.

(Technical Effect)

On the driving assistance apparatus 100, when the vehicle 1 travels on a road with a downgrade, the assistance start timing may be set to be delayed, in comparison with a situation in which the vehicle 1 travels on a road without a downgrade. Thus, according to the driving assistance apparatus 100, it is possible to prevent the driver from feeling discomfort due to the deceleration assistance control when the vehicle 1 travels on the road with a downgrade.

Moreover, if the deceleration target is not something that requires the vehicle 1 to stop, it is expected that the driver operates the vehicle 1 after the vehicle 1 is decelerated by the deceleration assistance control. On the other hand, if the deceleration target is something that requires the vehicle 1 to stop, it is expected that the driver does not operate the vehicle 1 until the vehicle 1 is stopped by the deceleration assistance control. Thus, if the deceleration target is not something that requires the vehicle 1 to stop, the driver's discomfort in starting the deceleration assistance control earlier than the timing intended by the driver is expected to be greater than those when the deceleration target is something that requires the vehicle 1 to stop. On the driving assistance apparatus 100, if the deceleration target is not something that requires the vehicle 1 to stop, the assistance start timing is set to be delayed, in comparison with a situation in which the deceleration target is something that requires the vehicle 1 to stop. Thus, according to the driving assistance apparatus 100, it is possible to further prevent the driver from feeling discomfort due to the deceleration assistance control.

Modified Examples (1) In the first embodiment described above, the assistance start timing is set in accordance with whether or not a road on which the vehicle 1 travels has a downgrade. If the road on which the vehicle 1 travels has a downgrade, the assistance start timing may be changed in accordance with an extent of the downgrade. In other words, if the extent of the downgrade is high, the assistance start timing may be delayed, in comparison with a situation in which the extent of the downgrade is low.

(2) In the first embodiment described above, if it is determined that the road on which the vehicle 1 travels has a downgrade, the assistance start timing is changed in accordance with whether, or not the deceleration target is something that requires the vehicle 1 to stop. Even if it is determined that the road on which the vehicle 1 travels does not have a downgrade, the assistance start timing may be changed in accordance with whether or not the deceleration target is something that requires the vehicle 1 to stop.

Second Embodiment

A driving assistance apparatus according to a second embodiment will be explained with reference to FIG. 4 to FIG. 6. The second embodiment is the same as the first embodiment, except that the operations of the external information recognition device 11 and the setting device 16 are partially different. Therefore, in the second embodiment, the same explanation as those in the first embodiment will be omitted. The same parts on the drawings will carry the same reference numerals and basically different points will be explained with reference to FIG. 4 to FIG. 6.
(Operations)

In the second embodiment, the setting device 16 is configured to set (or change) the target recognition area in accordance with an object that can correspond to the deceleration target, from among the one or the plurality of objects recognized as the surrounding situation of the vehicle 1. Thus, in the second embodiment, after the target recognition area is set by the setting device 16, the deceleration target may be recognized (or specified) by the external information recognition, device 11.

The external information recognition device 11 is configured to recognize the object that can correspond to the deceleration target, as a deceleration target candidate, from among the one or the plurality of objects recognized as the surrounding situation of the vehicle 1. Then, the external information recognition device 11 is configured to output the external information, which includes information indicating the recognized deceleration target candidate Next, operations of the driving assistance apparatus 100 according to the second embodiment will be, explained with reference to a flowchart in FIG. 4.

Figure 4:
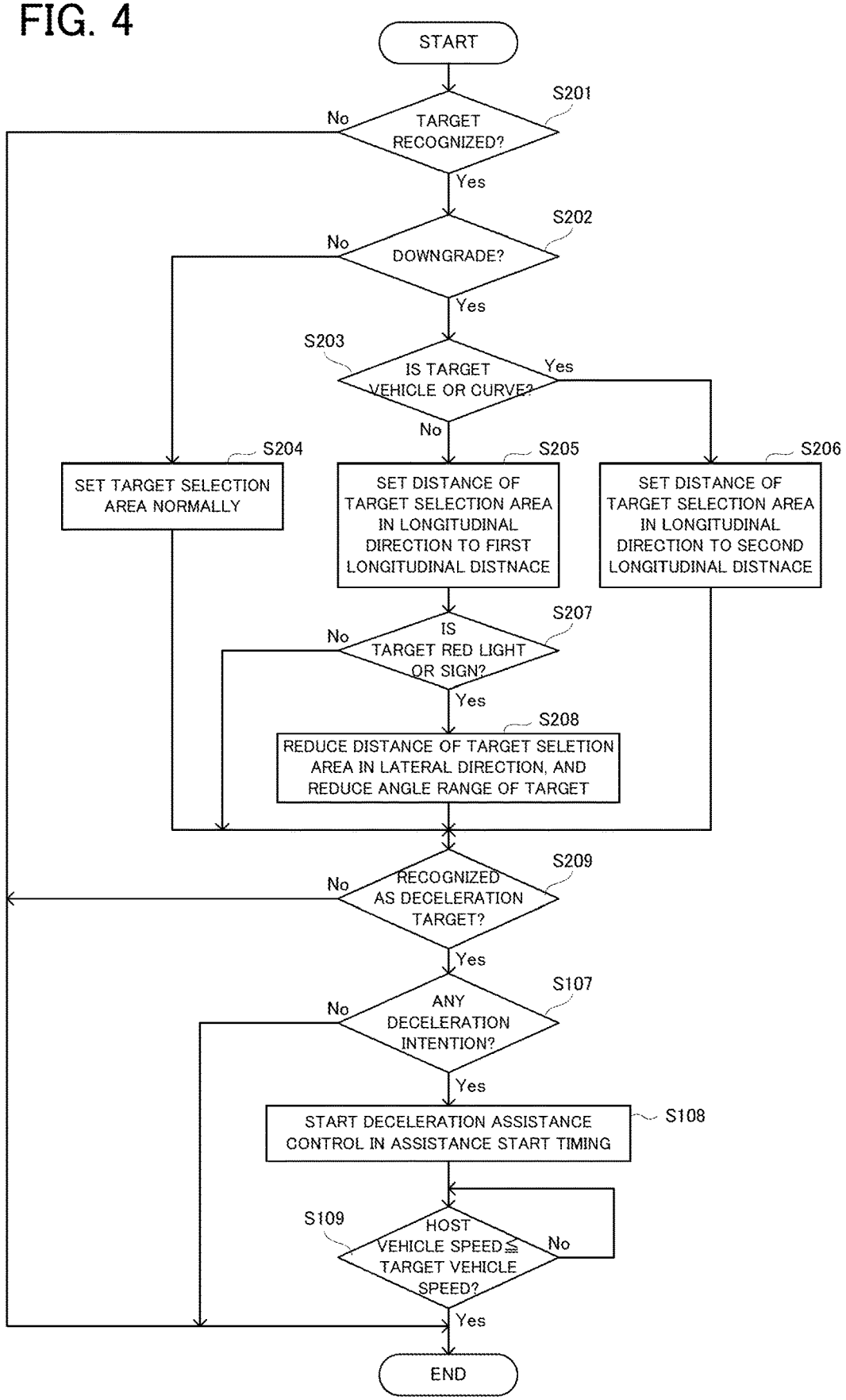
FIG. 4 is a flowchart illustrating operations of a driving assistance apparatus according to a second embodiment.

In FIG. 4, the setting device 16 determines whether or not the deceleration target candidate is recognized, on the basis of the external information outputted from the external information recognition device 11 (step S201). In the step S201, if it is determined that the deceleration target candidate is not recognized (the step S201: No), the operations illustrated in FIG. 4 are ended. Then, after a lapse of a second predetermined time (e.g., several ten milliseconds to several hundred milliseconds, etc.), the step S201 is executed. In other words, the operations illustrated in FIG. 4 are repeated with a period corresponding to the second predetermined time.

In the step S201, if it is determined that the deceleration target candidate is recognized (the step S201: Yes), the setting device 16 determines whether or not a road on which the vehicle 1 travels has a downgrade, on the basis of the grade information included in the external information (step S202). In the step S202, if it is determined that the road does not have a downgrade (the step S202: No), the setting device 16 sets the target selection area normally (step S204).

In the step S202, if it is determined that the road has a downgrade (the step S202: Yes), the setting device 1$ determines whether or not the deceleration target candidate is another vehicle or a curve (step S203). In the step S203, if it is determined that the deceleration target candidate is neither another vehicle nor a curve (the step S203: No), the setting device 16 sets a distance of the target selection area in a longitudinal direction (i.e., in a longitudinal direction of the vehicle 1) to a first longitudinal distance (refer to FIG. 5), which is less than the normal distance (i.e., a distance of the target selection area in the longitudinal direction set in the step S204) (step S205).

Figure 5:
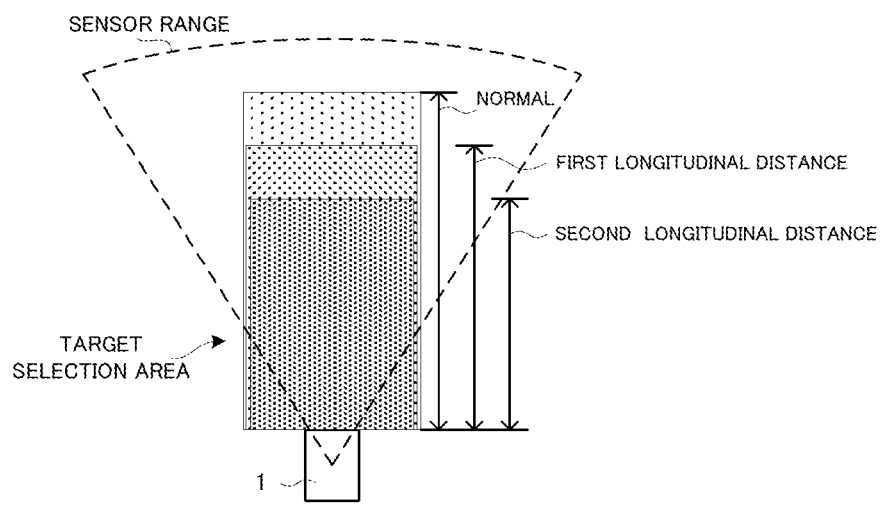
FIG. 5 is a diagram illustrating a concept of a target selection area.
Figure 6:
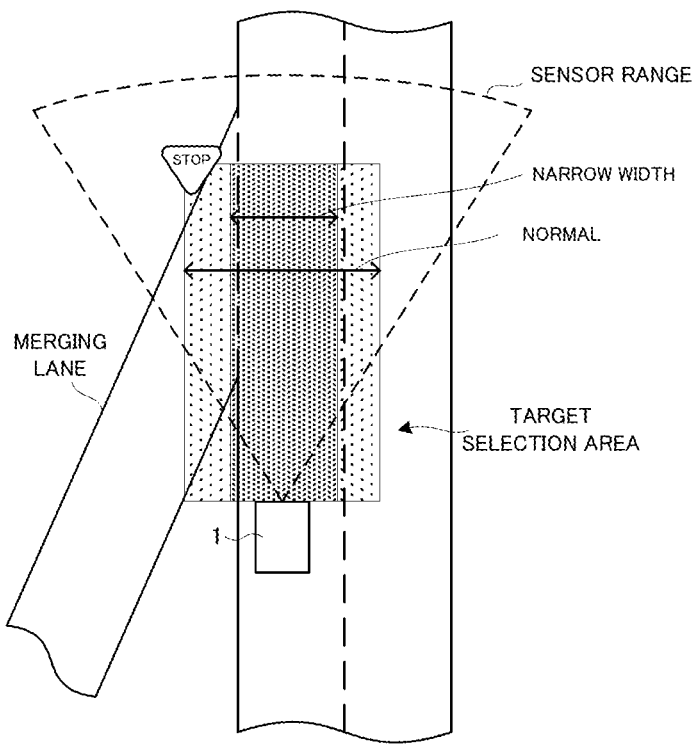
FIG. 6 is a diagram illustrating a concept of the target selection area.

Here, as illustrated in FIG. 5, if the distance of the target selection area in the longitudinal direction is reduced, then, unless a distance between the vehicle 1 and the object that can be the deceleration target, such as, for example, a stop sign, is relatively short, the stop sign may not be recognized as the deceleration target by the external information recognition device 11. In other words, from among the three conditions for executing the deceleration assistance control, at least the condition "(i) the deceleration target is recognized" is hardly satisfied. As a result, the execution of the deceleration assistance control may be suppressed.

Back in FIG. 4, after the step S205, the setting device 16 determines whether or not the deceleration target candidate is a red light or a sign (step S207). In the step S207, if it is determined that the deceleration target candidate is a red light or a sign (the step S207: Yes), the setting device 16 reduces a distance of the target selection area in a lateral direction (i.e., in a width direction of the vehicle 1) (refer to FIG. 6) a d reduces an angle range of the deceleration target candidate with respect to a direction of travel of the vehicle 1 (step S208).

The step S208 will be explained with reference to FIG. 6. In an example illustrated in FIG. 6, suppose that the vehicle 1 travels near a junction and that a stop sign for vehicles that travel on a merging lane is placed ahead of the vehicle 1. In this case, if no measures are taken, the stop sign is included in the target selection area, and the stop sign may be erroneously recognized as the deceleration target.

Thus, in the second embodiment, the distance of the target selection area in the lateral direction is reduced to prevent the erroneous recognition. If the distance of the target selection area in the lateral direction is reduced too much, however, the deceleration target may not be accurately recognized. Thus, there is a limit to how much to reduce the distance of the target selection area in the lateral direction. Here, the red light or the sign is placed to be substantially faced to vehicles that travel on a lane subject to regulation. Thus, for example, if an angle of the red light or the sign as the deceleration target candidate with respect to the direction of travel of the vehicle 1 is in a predetermined angle range, then, it can be said that the red light or the sign as the deceleration target candidate is something that regulates the travel of the vehicle 1. In other words, it can be said that the red light or the sign is placed on a lane or road on which the vehicle 1 travels. In the second embodiment, considering this point, the predetermined angle range is reduced such that it is strictly determined whether or not the red signal or the sign as the deceleration target candidate is something that regulates the travel of the vehicle 1 (in other words, such that a red signal or a sign unrelated to the travel of the vehicle 1 is not erroneously recognized as the deceleration target even if the red light or the sign is included in the target selection area).

Back in FIG. 4, in the step S203, if it is determined that the deceleration target candidate is another vehicle or a curve (the step S203: Yes), the setting device 16 sets the distance of the target selection area in the longitudinal direction to a second longitudinal distance (refer to FIG. 5), which is less than the first longitudinal distance (step S206).

After the step S204, the step S206, or the step S208, or in the step S207, if it is determined that the deceleration target candidate is neither a red light nor a sign (the step S207: No), the deceleration intention determination device 13 determines whether or not the deceleration target is recognized, on the basis of the external information outputted from the external information recognition device 11, after the target recognition area is set by the setting device 16 (step S209).

In the step S209, if it is determined that the deceleration target is not recognized (the step S209: No), the operations illustrated in FIG. 4 are ended. Then, after a lapse of the second predetermined time, the step S201 is executed. On the other hand, in the step S209, if it is determined that the deceleration target is recognized (the step S209: Yes), the step S107 is executed.

(Technical Effect)

When the vehicle 1 goes down a slope, if the driver intends to stop or decelerate the vehicle 1 due to the presence of the deceleration target ahead of the vehicle in the course thereof, in many cases, the driver turns off the accelerator in timing in which the vehicle 1 travels relatively far from the deceleration target. Specifically, as illustrated in FIG. 2A, if the entrance of the curve as the deceleration target is at the position P1, the driver turns off the accelerator at a position P0, which is relatively far from the position P1.

If the condition "(i) the deceleration target is recognized" is satisfied, the deceleration assistance control may be executed when the other two conditions are satisfied. Thus, if the deceleration target is recognized, for example, when the vehicle 1 travels at the position P0, the deceleration assistance control may be executed immediately after the driver turns off the accelerator.

As described above, however, in the case of the downgrade, if the target selection area is reduced in comparison with a situation in which the road does not have a downgrade, the entrance of the curve that can be the deceleration target is relatively likely not recognized as the deceleration target when the vehicle 1 is relatively far from the entrance of the curve. As a result, from among three conditions for executing the deceleration assistance control, at least the condition "(i) the deceleration target is recognized" is hardly satisfied, and thus, the execution of the deceleration assistance control may be also suppressed.

Therefore, according to the driving assistance apparatus 100 in the second embodiment, as in the driving assistance apparatus 100 in the first embodiment, it is possible to prevent the driver from feeling discomfort due to the deceleration assistance control when the vehicle 1 travels on the road with a downgrade. Even in the second embodiment, as in the modified example of the first embodiment, if the road on which the vehicle 1 travels has a downgrade, the distance of the target selection area in the longitudinal direction may be changed in accordance with the extent of the downgrade. In other words, if the extent of the downgrade is high, the distance of the target selection area in the longitudinal direction may be reduced, in comparison with a situation in which the extent of the downgrade is low.

Third Embodiment

A driving assistance apparatus according to a third embodiment will be explained with reference to FIG. 7. The third embodiment is a combination of the first embodiment and the second embodiment described above. Therefore, in the third embodiment, the same explanation as those in the first and second embodiments will be omitted. The same parts on the drawings will carry the same reference numerals and basically different points will be explained with reference to FIG. 7.

(Operations)

Figure 7:
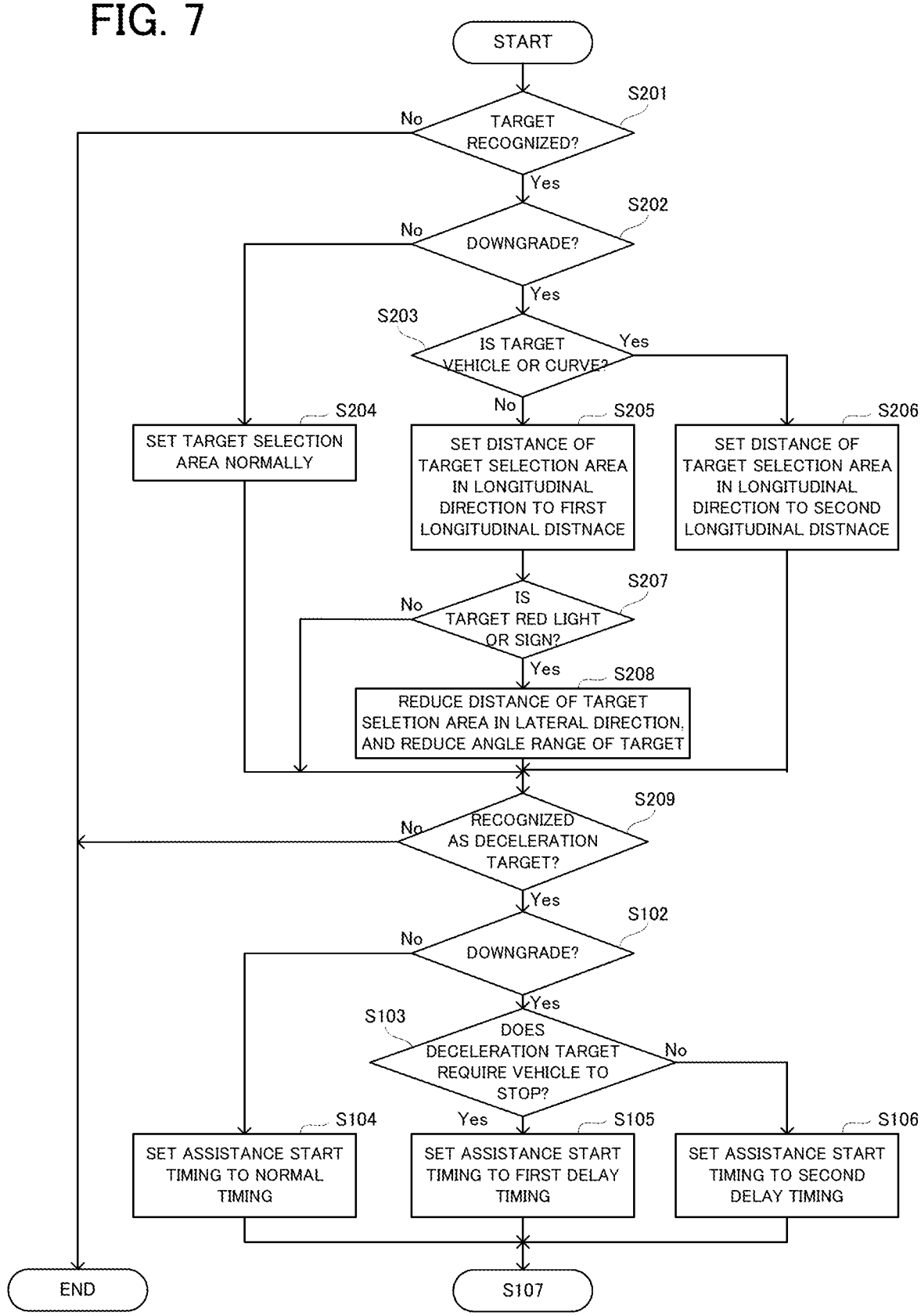
FIG. 7 is a flowchart illustrating operations of a driving assistance apparatus according to a third embodiment.

In the step S209 in FIG. 7, if it is determined that the deceleration target is recognized (the step S209; Yes), the setting device 16 determines whether or not the road on which the vehicle 1 travels has a downgrade, on the basis of the grade information included in the external information (the step S102). In the step S102, if it is determined that the road has a downgrade (the step S102: Yes), the step S103 is executed. On the other hand, if it is determined that the road does not have a downgrade (the step S102: No), the step S104 is executed.

Various aspects of embodiments of the present disclosure derived from the embodiments and modified examples explained, above will be explained hereinafter.

A driving assistance apparatus according to an aspect of embodiments of the present disclosure is a driving assistance apparatus configured to execute a deceleration assistance control of assisting in decelerating a vehicle, when there is a deceleration target ahead of the vehicle in a course thereof, the driving assistance apparatus provided with: a recognizer configured to recognize a surrounding situation of the vehicle; and a controller programed to execute the deceleration assistance control when a predetermined condition is satisfied, wherein the controller is programmed to suppress execution of the deceleration assistance control if a road as the recognized surrounding situation has a downgrade, in comparison with a situation in which the road does not have a downgrade.

In the embodiments described above, the "external information recognition device 11" corresponds to the "recognizer". The "deceleration intention determination device 13", the "assistance amount arithmetic device 14", and the setting device 16 correspond to an example of the "controller".

The "deceleration target" may be something that requires the vehicle to decelerate or stop. Specifically, an example includes: an obstacle, such as, for example, another vehicle, a pedestrian, and a structure; something that regulates travel of the vehicle 1, such as, for example, a road sign, a red light, and a stop line; and a road structure, such as, for example, an intersection and a curve.

The recognizer is configured to recognize the surrounding situation of the vehicle. The recognizer is configured to recognize at least a grade of a road on which the vehicle travels. A detailed explanation of a method of recognizing the surrounding situation of the vehicle is omitted because various existing aspects can be applied.

The controller is programmed to execute the deceleration assistance control when the predetermined condition is satisfied. The "predetermined condition" may be a condition for determining whether or not the deceleration assistance control is to be executed. The "predetermined condition" as described above may be set, for example, as a condition that allows the determination of a situation in which the vehicle is to be decelerated or stopped, by experiments, experiences, or simulations. A condition associated with the road grade is typically not included in the "predetermined condition".

Particularly in the driving assistance apparatus, if the road on which the vehicle travels has a downgrade, the execution of the deceleration assistance control is suppressed by the controller, in comparison with the situation in which the road does not have a downgrade. In other words, if the road has a downgrade, a braking force caused by the deceleration assistance control is hardly applied to the vehicle, in comparison with the situation in which the road does not have a downgrade.

Here, if a driver intends to stop the vehicle when the vehicle goes down on a slope, the driver tends to turn off an accelerator (i.e., stop stepping on an accelerator pedal) earlier than when the vehicle travels on a flatland. In other words, if the driver intends to stop the vehicle when the vehicle goes down on a slope, a time from when the driver stops stepping on the accelerator pedal to when the driver steps on the brake pedal tends to be longer than those when the vehicle travels on a flatland. If the deceleration assistance control is uniformly executed regardless of the road grade, the driver may feel discomfort.

Since the driving assistance apparatus is configured to as described above, it is possible to prevent a braking force caused by the deceleration assistance control from being applied to the vehicle when the vehicle goes down on a slope, in comparison with the situation in which the vehicle travels on a flatland. Thus, according to the driving assistance apparatus, for example, when the vehicle goes down on a slope, even if the accelerator is turned off earlier than when the vehicle travels on a flatland, it is possible to appropriately execute the deceleration assistance control while preventing the driver from feeling discomfort.

In an aspect of the driving assistance apparatus, if the road has a downgrade, the controller is programmed to suppress the execution of the deceleration assistance control, (1) by increasing a period from a time point at which satisfying the predetermined condition to a time point at which starting the deceleration assistance control, and/or (ii) by making it difficult to satisfy the predetermined condition, in comparison with the situation in, which the road does not have a downgrade. By virtue of such a configuration, it is possible to suppress the execution of the deceleration assistance, relatively easily.

In another aspect of the driving assistance apparatus, if the deceleration target is not something that requires the vehicle to stop, the controller is programmed to increase a period from a time point at which satisfying the predetermined condition to a time point at which starting the deceleration assistance control, in comparison with a situation in which the deceleration target is something that requires the vehicle to stop.

Here, if the deceleration target is not something that requires the vehicle to stop, it is expected that the driver operates the vehicle after the vehicle is decelerated by the deceleration assistance control. On the other hand, if the deceleration target is something that requires the vehicle to stop, it is expected that the driver does not operate the vehicle until the vehicle is stopped by the deceleration assistance control. Thus, if the deceleration target is not something that requires the vehicle to stop, the driver's discomfort in starting the deceleration assistance control earlier than the timing intended by the driver is expected to be greater than those when the deceleration target is something that requires the vehicle to stop. Therefore, by virtue of a configuration as described above, it is possible to further prevent the driver from feeling discomfort.

In an aspect in which the execution of the deceleration assistance control is suppressed by making it difficult to satisfy the predetermined condition, the predetermined condition may include such a requirement that the deceleration target is recognized by the recognizer, the recognizer may be configured to recognize one or a plurality of objects around the vehicle as the surrounding situation and may be configured to recognize an object that is in a predetermined range from the vehicle, as the deceleration target, from among the one or the plurality of objects recognized, and the controller may be programmed to make it difficult to satisfy the predetermined condition, by reducing the predetermined range, if the road has a high extent of the downgrade, in comparison with a situation in which the road has a low extent of the downgrade.

When the vehicle goes down a slope, if the driver intends to stop the vehicle due to the presence of a stop sign ahead of the vehicle in the course thereof, in many cases, the driver turns off the accelerator in timing in which the vehicle travels relatively far from the stop sign. At this time, if the stop sign is recognized as the deceleration target by the recognizer, the deceleration assistance control may be executed immediately after the accelerator is turned off. As described above, however, if the predetermined range is reduced, the stop sign is relatively likely not recognized as the deceleration target when the vehicle is relatively far from the stop sign. As a result, the predetermined condition is hardly satisfied, and thus, the execution of the deceleration assistance control may be also suppressed. In other words, by virtue of a configuration as described above, even if the driver turns off the accelerator in the timing in which the vehicle travels relatively far from the stop sign, it is possible to suppress the execution of the deceleration assistance control immediately after the accelerator is turned off. The "target selection area" in the embodiments described above corresponds to an example of the "predetermined range".

In another aspect of the driving assistance apparatus, the controller is programmed to suppress the execution of the deceleration assistance control if the road has a downgrade and if the road has a high extent of the downgrade, in comparison with a situation in which the road has a low extent of the downgrade. By virtue of such a configuration, it is possible to further prevent the driver from feeling discomfort.

The present disclosure may be embodied in other specific forms without departing from the spirit or characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus configured to execute a deceleration assistance control of assisting in decelerating a vehicle, when there is a deceleration target ahead of the vehicle in a course thereof, said driving assistance apparatus comprising:
    an external information recognition device configured to recognize a surrounding situation of the vehicle; and
    a controller programed to execute the deceleration assistance control when a predetermined condition is satisfied, wherein
    said controller is programmed to suppress execution of the deceleration assistance control when a road as the recognized surrounding situation has a downgrade, in comparison with a situation in which the road does not have a downgrade,
    wherein when the road has a downgrade, said controller is programmed to suppress the execution of the deceleration assistance control by (i) increasing a period from a time point at which satisfying the predetermined condition to a time point at which starting the deceleration assistance control and/or (ii) making it difficult to satisfy the predetermined condition, in comparison with the situation in which the road does not have a downgrade.

2. The driving assistance apparatus according to claim 1, wherein when the deceleration target is not something that requires the vehicle to stop, said controller is programmed to increase a period from a time point at which satisfying the predetermined condition to a time point at which starting the deceleration assistance control, in comparison with a situation in which the deceleration target is something that requires the vehicle to stop.

3. The driving assistance apparatus according to claim 2, wherein said controller is programmed to suppress the execution of the deceleration assistance control when the road has a downgrade and when the road has a high extent of the downgrade, in comparison with a situation in which the road has a low extent of the downgrade.

4. The driving assistance apparatus according to claim 1, wherein
the predetermined condition includes such a requirement that the deceleration target is recognized by said external information recognition device,
said external information recognition device is configured to recognize one or a plurality of objects around the vehicle as the surrounding situation and is configured to recognize an object that is in a predetermined range from the vehicle, as the deceleration target, from among the one or the plurality of objects recognized, and
said controller is programmed to make it difficult to satisfy the predetermined condition, by reducing the predetermined range, when the road has a high extent of the downgrade, in comparison with a situation in which the road has a low extent of the downgrade.

5. The driving assistance apparatus according to claim 4, wherein said controller is programmed to suppress the execution of the deceleration assistance control when the road has a downgrade and when the road has a high extent of the downgrade, in comparison with a situation in which the road has a low extent of the downgrade.

6. The driving assistance apparatus according to claim 1, wherein said controller is programmed to suppress the execution of the deceleration assistance control when the road has a downgrade and when the road has a high extent of the downgrade, in comparison with a situation in which the road has a low extent of the downgrade.

7. The driving assistance apparatus according to claim 1, wherein said external information recognition device is configured to receive an output of at least one of a radar, a camera, and a light detection and ranging (Lidar) and recognize the surrounding situation of the vehicle based on such output.

* * * * *